(12) United States Patent
Onodera

(10) Patent No.: US 8,795,802 B2
(45) Date of Patent: Aug. 5, 2014

(54) FOAM DUCT

(71) Applicant: Kyoraku Co., Ltd., Kyoto (JP)

(72) Inventor: Masaaki Onodera, Kanagawa (JP)

(73) Assignee: Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 13/761,262

(22) Filed: Feb. 7, 2013

(65) Prior Publication Data

US 2013/0224414 A1    Aug. 29, 2013

(30) Foreign Application Priority Data

Feb. 28, 2012    (JP) .................................. 2012-042294

(51) Int. Cl.
| | |
|---|---|
| *B29D 22/00* | (2006.01) |
| *F16L 9/00* | (2006.01) |
| *F16L 59/14* | (2006.01) |
| *B32B 1/08* | (2006.01) |

(52) U.S. Cl.
CPC .................. *F16L 9/003* (2013.01); *F16L 59/14* (2013.01); *B32B 1/08* (2013.01); *Y10S 138/09* (2013.01); *Y10S 138/11* (2013.01)
USPC .................... 428/36.5; 138/140; 138/DIG. 9; 138/DIG. 11

(58) Field of Classification Search
CPC ... B32B 1/08; B29L 2023/22; B29C 44/1242; Y10S 138/09; Y10S 138/11; F16L 9/003; F16L 59/14

USPC ................ 428/36.5, 35.5; 138/138, 137, 140, 138/DIG. 9, DIG. 11
See application file for complete search history.

(56) References Cited

U.S. PATENT DOCUMENTS

| | | | | |
|---|---|---|---|---|
| 2,226,523 | A  * | 12/1940 | Peck ................................ | 285/55 |
| 6,933,028 | B2 * | 8/2005 | Milhas ........................ | 428/36.91 |
| 2013/0224414 | A1 * | 8/2013 | Onodera ...................... | 428/36.5 |

FOREIGN PATENT DOCUMENTS

| | | |
|---|---|---|
| JP | 2010-236838 | 10/2010 |
| JP | 2011-116120 | 6/2011 |
| JP | 2011-194700 | 10/2011 |
| WO | 99/49262 | 9/1999 |

OTHER PUBLICATIONS

U.S. Appl. No. 13/761,275 to Masaaki Onodera, filed Feb. 7, 2013.
Korea Office action, dated Mar. 25, 2014 along with an English translation.

* cited by examiner

*Primary Examiner* — N. Edwards
(74) *Attorney, Agent, or Firm* — Greenblum & Bernstein P.L.C.

(57) ABSTRACT

A foam duct in which rigidity is improvable includes a cylindrical portion having an external contour of a polygonal shape and a projection in an inner surface side of the cylindrical portion, and thickness of wall portions of the cylindrical portion is larger in a portion in which the projection is formed than in a portion in which the projection is not formed.

6 Claims, 11 Drawing Sheets

X-X' CROSS SECTION

X-X' CROSS SECTION (a)

(b)

X-X' CROSS SECTION (a)

X-X' CROSS SECTION (b)

X-X' CROSS SECTION (a)

(b)

FOAM DUCT

BACKGROUND

1. Technical Field

The present invention relates to a foam duct including foam resin.

2. Related Art

As the duct for vehicles such as cars, a foam duct including foam resin is employed. The foam duct is less heavy than a duct including non-foam resin and is hence suitable for vehicles the weight of which is desired to be reduced from a viewpoint of fuel efficiency and the like.

The foam duct of this kind is ordinarily produced in the following molding method. First, a foam resin prepared by melting and kneading various materials is extruded from an annular die of an extruding machine to form a cylindrical foam parison. The foam parison is clamped by a metallic mold and then air is blown into the foam parison in the metallic mold to push the foam parison against a cavity of the metallic mold to thereby shape the foam parison. The foam parison is then extended to be molded in a contour of the cavity. Thereafter, the molded item having the cavity contour is cooled. The mold is then opened. The molded item is removed and undesired portions thereof are removed, to thereby obtain a desired foam duct.

Document for the foam duct includes, for example, Patent Document 1 (Japanese Patent Laid-Open Ser. No. 2011-194700) and Patent Document 2 (Japanese Patent Laid-Open Ser. No. 2011-116120).

According to Patent Document 1, it is possible, by defining each material of the foam resin, to mold a lightweight foam duct having a sufficient property against low-temperature shock by using less expensive material composition and by decreasing the kinds of mixing materials.

According to Patent Document 2, it is possible, by defining polypropylene-based resins constituting the foam resin, to mold a foam duct with a high expansion ratio in which pinholes are not easily formed even with a high blow ratio.

PATENT DOCUMENT

Patent Document 1: Japanese Patent Laid-Open Ser. No. 2011-194700
Patent Document 2: Japanese Patent Laid-Open Ser. No. 2011-116120

SUMMARY OF THE INVENTION

In the foam duct described above, it is favorable to reduce thickness of wall portions of the foam duct, to lower the weight thereof. However, when wall portions of the foam duct become thin, rigidity of the foam duct decreases and the foam duct is easily deflected, and it is difficult to attach the foam duct onto a member of a car and the like. Also, when fluid such as gas flows on an inner surface of the foam duct, vibration occurs depending on cases. Incidentally, in the foam ducts described in Patent Document 1 and Patent Document 2, inner walls of the foam duct are smoothed. However, in a situation wherein inner walls of a foam duct are smoothed as in the foam ducts described in Patent Document 1 and Patent Document 2, when wall portions of the foam duct become thin, rigidity of the foam duct decreases, and there exists a fear of occurrence of the problem described above. Also, in a situation wherein inner walls of edge portions of the opening of the foam duct are smoothed, for example, when an inner surface side of the foam duct is engaged with an outer surface side of another member to connect the foam duct to the member, a gap takes place between the inner surface side of the foam duct and the outer surface side of the member and the foam duct is easily removed from the member in some cases.

It is therefore an object of the present invention, which has been made in consideration of the situation above, to provide a foam duct in which it is possible to increase rigidity.

To achieve the object, the present invention has an aspect as follows.

The foam duct in accordance with the present invention is a foam duct including foam resin and includes a cylindrical portion having an external contour of a polygonal shape and a projection in an inner surface side of the cylindrical portion, and thickness of wall portions of the cylindrical portion is larger in a portion in which the projection is formed than in a portion in which the projection is not formed.

In accordance with the present invention, it is possible to increase rigidity of the foam duct.

DESCRIPTION OF THE EMBODIMENT

<Outline of Foam Duct 200>

Figure 1:
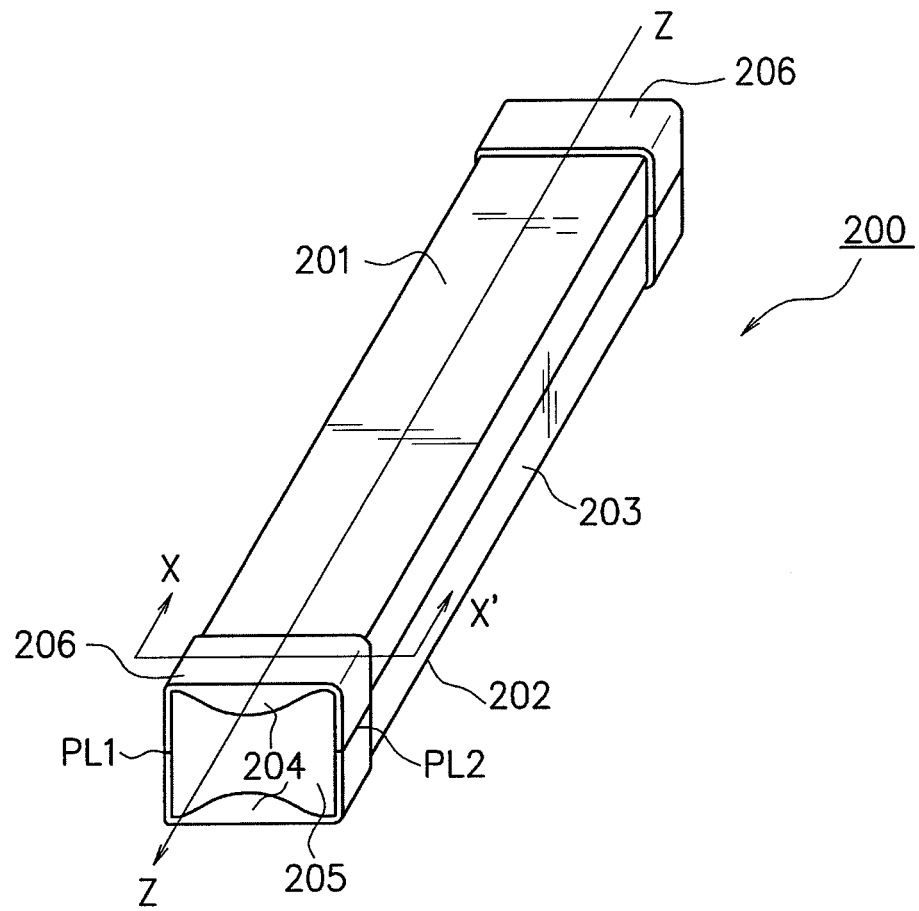
FIG. 1 is a diagram showing a configuration example of a foam duct 200 in a first embodiment.

First, referring to FIGS. 1 to 4, description will be given of an outline of the foam duct 200 according to the present embodiment.

The foam duct 200 of the present embodiment is a foam duct 200 including foam resin. The foam duct 200 has an aspect in which the foam duct 200 includes a cylindrical portion (corresponding to the connecting portion 206) having a polygonal outer contour and includes projection 204 on an inner surface side of the cylindrical portion 206; and thickness of wall portions of the cylindrical portion is larger in a portion in which the projection 204 is formed than in a portion in which the projection 204 is not formed.

The foam duct 200 of the present embodiment includes the projection 204 on an inner surface side of the cylindrical portion 206. Hence, it is possible to improve rigidity of the foam duct 200. Also, as shown in FIGS. 1 to 4, the foam duct 200 includes the cylindrical portion 206 in an edge portion of the opening. Hence, for example, when an inner surface side of the foam duct 200 is engaged with an outer surface side of another member 300 to connect the foam duct to the member, the projection 204 makes contact with an outer surface of the member 300. This prevents the event in which the foam duct 200 is easily removed from the member 300. In addition, the projection 204 includes foam resin. Hence, in the state shown in FIG. 2, when the outer surface of the member 300 makes contact with the projection 204, the projection 204 deforms along the outer surface contour of the member 300 to thereby hold the member 300 as shown in FIG. 4.

Figure 3:
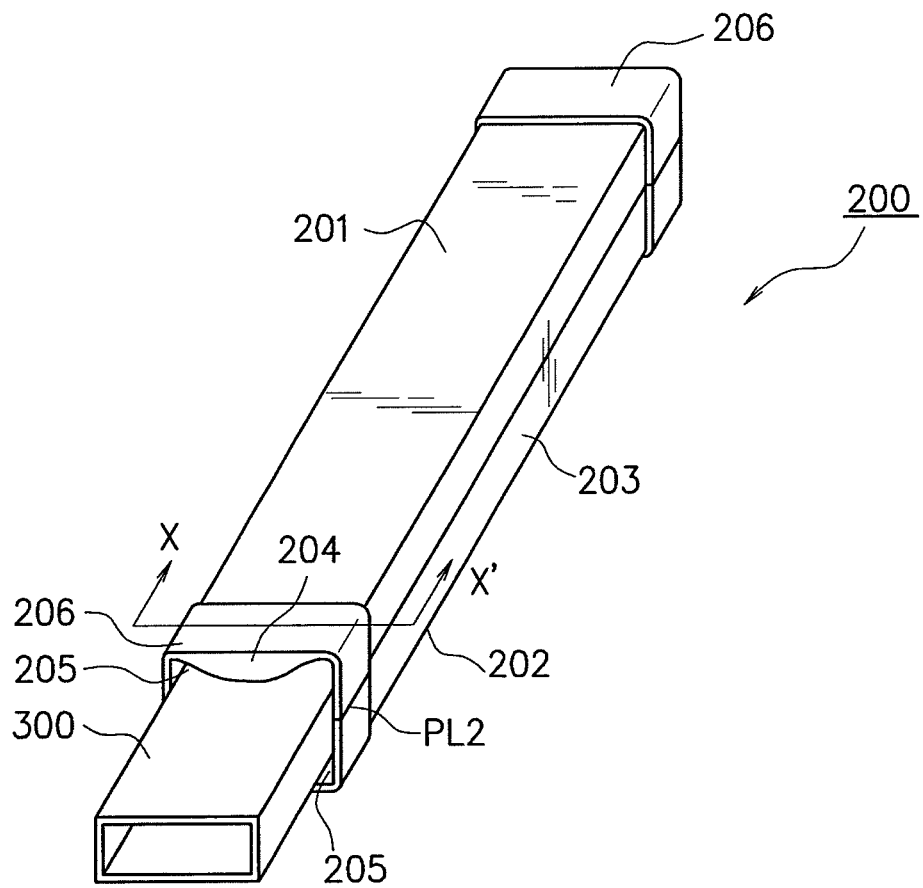
FIG. 3 is a diagram showing a state in which another member 300 is connected to the connecting portion 206 of the foam duct 200 shown in FIG. 1.
Figure 4:
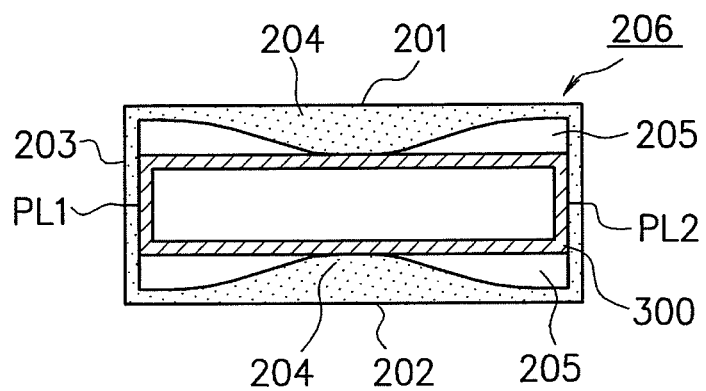
FIG. 4 is a diagram showing an example of an X-X' cross-sectional configuration perpendicular to the hollow extending direction of the connecting portion 206 shown in FIG. 3.
Figure 8:
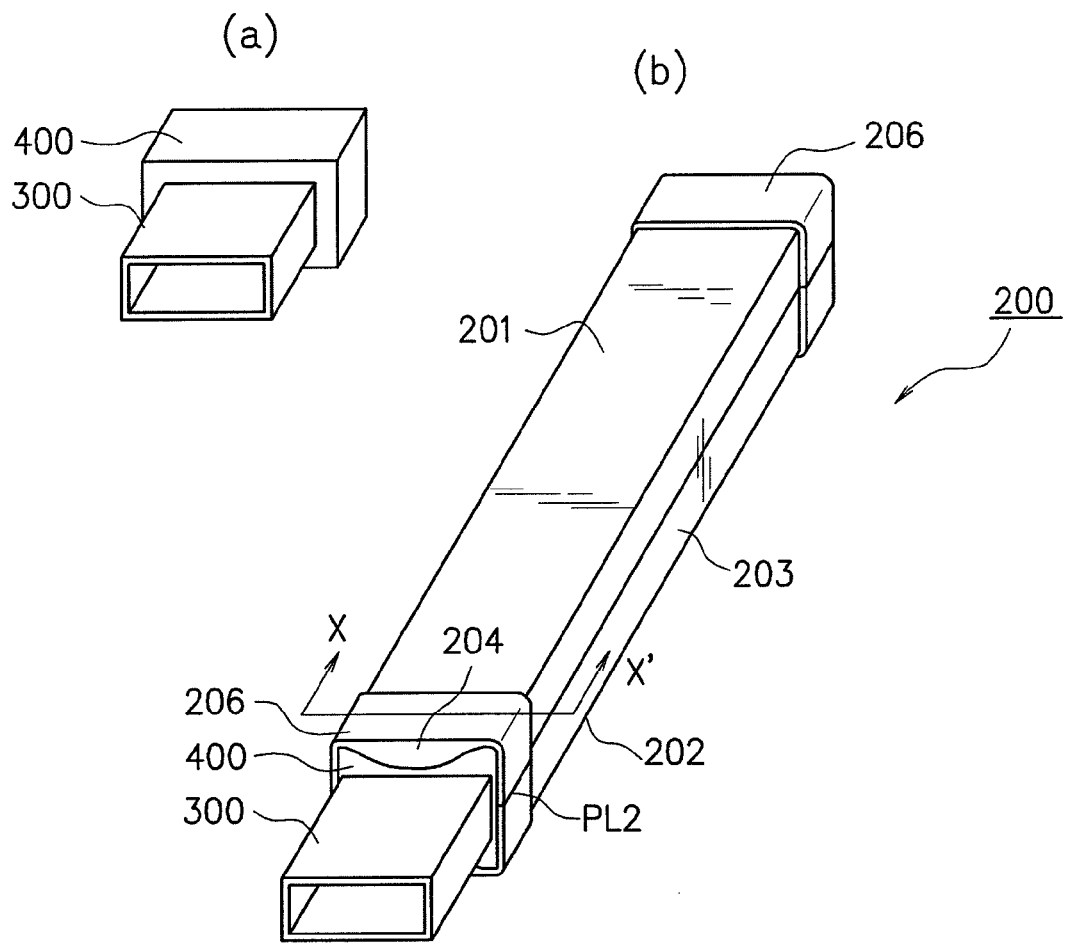
FIG. 8 is a diagram showing a state in which another member 300 in which a packing member 400 is pasted onto an outer periphery is connected to the connecting portion 206.
Figure 8:
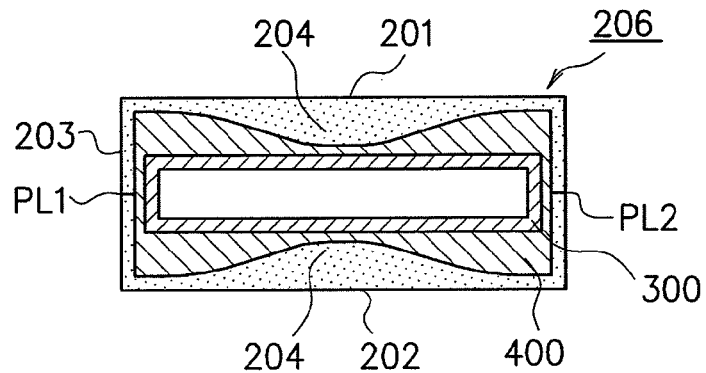

FIGS. 3 and 4 schematically show a gap between the outer surface of the member 300 and the inner surface of the cylindrical portion 206. However, to remove the gap, it is also possible that for example, as shown in FIG. 8, a packing member 400 such as foam urethane is pasted around the outer surface of the member 300, and the member 300 around which the packing member 400 is pasted is inserted in the inner surface side of the cylindrical portion 206 for the connection therebetween. This makes it possible to prevent occurrence of the gap between the outer surface of the member 300 and the inner surface of the cylindrical portion 206. Further, it is possible that the external surface contour of the member 300 itself is designed to follow the inner surface contour of the cylindrical portion 206, to thereby prevent occurrence of the gap between the outer surface of the member 300 and the inner surface of the cylindrical portion 206. Next, referring to the accompanying drawings, description will be given in detail of the foam duct 200 of the present embodiment. In the following description, a connecting portion 206 disposed in an opening edge portion of the foam duct 200 is employed as an example of the cylindrical portion 206 having a polygonal outer contour. However, the cylindrical portion 206 is not limited to the connecting portion 206 disposed in an opening edge portion of the foam duct 200. It is also possible that a portion other than the opening edge portion is formed in a polygonal contour such that the projection 204 is disposed on the inner surface side of the polygonal-contour portion (cylindrical portion).

First Embodiment

<Configuration Example of Foam Duct 200>

Figure 2:
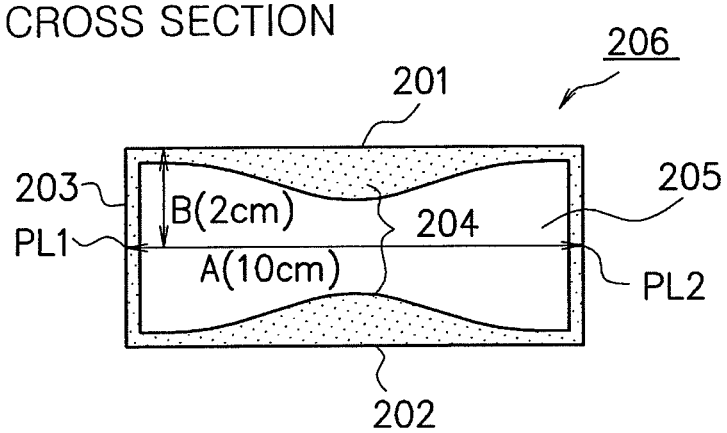
FIG. 2 is a diagram showing an example of an X-X' cross-sectional configuration perpendicular to the hollow extending direction of a connecting portion 206 of the foam duct 200 shown in FIG. 1.

Referring to FIGS. 1 to 4, description will be given of a configuration example of the foam duct 200 of the present embodiment. FIG. 1 shows a configuration example of the foam duct 200. FIG. 2 shows an example of an X-X' cross-sectional configuration perpendicular to the hollow extending direction of the connecting portion 206 shown in FIG. 1. FIG. 3 shows a state in which another member 300 is connected to the connecting portion 206 of the foam duct 200. FIG. 4 shows an example of an X-X' cross-sectional configuration perpendicular to the hollow extending direction of the connecting portion 206 shown in FIG. 2.

The foam duct 200 is molded by blowing foam resin with an expansion ratio of 2.0 or more in independent bubble structure including a plurality of foamed cells.

The foam duct 200 includes a first wall portion 201, a second wall portion 202 opposing the first wall portion 201 with a gap therebetween, and a peripheral wall 203 connecting circumferences of the first and second wall portions 201 and 202 to each other. In the peripheral wall 203, parting lines PL1 and PL2 are formed.

As the foam resin for the foam duct 200, there may be employed, for example, a resin prepared by adding a foaming agent to a polypropylene-based resin having an equilibrium compliance of 2.0 to 6.0 ($10^{-3} \times Pa^{-1}$). As the foaming agent, there may be used inorganic physical foaming agents such as air, carbon dioxide, nitrogen dioxide, and water; organic physical foaming agents such as butane, pentane, hexane, dichloromethane, and dichloroethane; and chemical foaming agents such as sodium bicarbonate, citric acid, sodium citrate, and azodicarbonamide. Further, for these physical and chemical foaming agents, it is also possible to employ a physical foaming agent in combination with a chemical foaming agent. In this regard, the foam resin for the foam duct 200 is not limited to these materials, but any known foaming agent is also applicable.

The foam duct 200 includes a hollow portion 205 in an inner surface of the duct such that fluid such as air flows through the hollow portion 205. At a first end and a second end in the longitudinal direction of the foam duct 200, a connecting portion 206 having a polygonal external contour is disposed to connect to another member 300 (reference is to be made to FIGS. 3 and 4). The opening of the connecting portion 206 in this embodiment has a rectangular contour to configure a female-type connecting portion 206 as shown in FIGS. 3 and 4 such that an inner surface side of the connecting portion 206 engages with an outer surface side of the member 300 for the connection therebetween.

The foam duct 200 includes a projection 204 in an inner surface side of the connecting portion 206 as shown in FIG. 2. Thickness of the wall portion configuring the connecting portion 206 is larger in the portion in which the projection 204 is formed than in the portion in which the projection 204 is not formed.

The first and second wall portions 201 and 202 of the foam duct 200 have a mean thickness ranging from 2.0 mm to 3.0 mm. The mean thickness is calculated as below. First, in cross-sections at three positions including the center and the first and second ends (upper and lower ends) of the foam duct 200, measurement is conducted by use of a pair of slide calipers to obtain thickness of each portion at six positions in total at which a perpendicular bisector of a straight line between two mold splitting points intersects the first and second wall portions 201 and 202. The mean value of the six measured values thus obtained is employed as the mean thickness.

In the cross-sectional contour of the connecting portion 206 shown in FIG. 2, the difference in thickness between the portion in which the projection 204 is not formed and the portion in which the projection 204 is formed ranges from 0.5 mm to 1.0 mm. The thickness of the cross-sectional contour of the connecting portion 206 takes the maximum value in the portion in which the projection 204 is formed. To increase the difference in thickness for the inner surface of the duct, the blow ratio is favorably 0.2 or more and is more favorably 0.4 or more. As FIG. 2 shows, the blow ratio of the connecting portion 206 is a ratio (B/A), taken in the cross-section perpendicular to the hollow extending direction, between length A of a straight line connecting parting lines PL1 and PL2 to each other and distance B from straight line A to an outer surface of the wall portion most apart therefrom. The blow ratio is 0.2 in FIG. 2.

The foam duct 200 of the present embodiment includes the projection 204 in an inner surface side of the connecting portion 206. Hence, as shown in FIGS. 3 and 4, when another member 300 is inserted in the inner surface side of the connecting portion 206 to engage the inner surface side of the connecting portion 206 with an outer surface side of the member 300 for the connection therebetween, the projection 204 makes contact with the outer surface side of the member 300. Also, since the projection 204 includes foam resin, when the projection 204 makes contact with the outer surface side of the member 300 in the state shown in FIG. 2, the projection 204 deforms along the outer surface contour of the member 300, to hold the member 300 as shown in FIG. 4. Hence, it is possible to prevent the event in which the foam duct 200 is easily removed from the member 300. In this regard, the foam duct 200 includes a projection 204 not only in the opening edge portions, but also in an inner surface of the duct in other than opening edge portions, to thereby improve rigidity of the foam duct 200. When wall portions of the foam duct 200 become generally thin, the foam duct 200 is easily deflected. Hence, it is difficult to attach the foam duct 200 onto a member of a car and the like. Further, when fluid such as gas flows on an inner surface of the foam duct 200, vibration occurs depending on cases. This problem is more remarkable when the foam duct 200 has a complex contour in which the foam duct 200 deflects in three-directional directions. Therefore, rigidity of the foam duct 200 is improved by disposing the projection 204 in the duct inner surface. In this situation, the projection 204 is favorably disposed in a continuous fashion along the channel direction of the fluid flowing through the inside of the foam duct 200. This further prevents deflection of the foam duct 200 and occurrence of vibration in the foam duct 200.

<Foam Duct 200 Molding Method Example>

Figure 5:
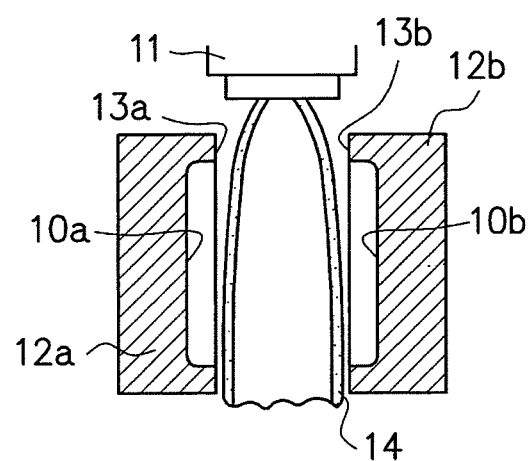
FIG. 5 is a first diagram showing an example of the molding method of the foam duct 200.
Figure 6:
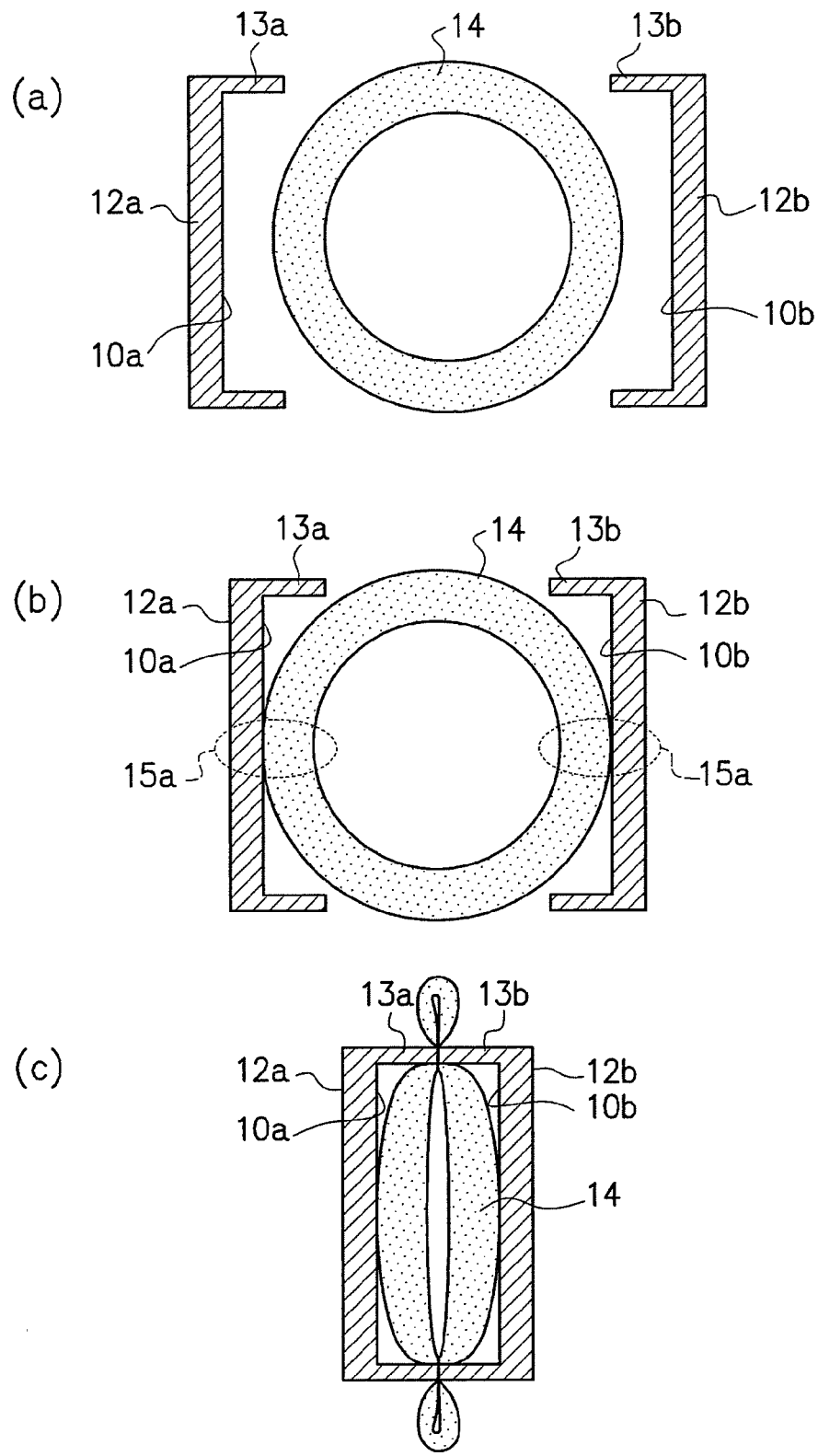
FIG. 6 is a second diagram showing an example of the molding method of the foam duct 200.
Figure 7:
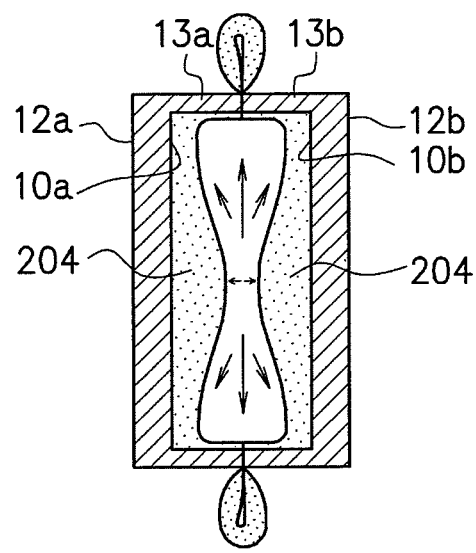
FIG. 7 is a third diagram showing an example of the molding method of the foam duct 200.
Figure 7:
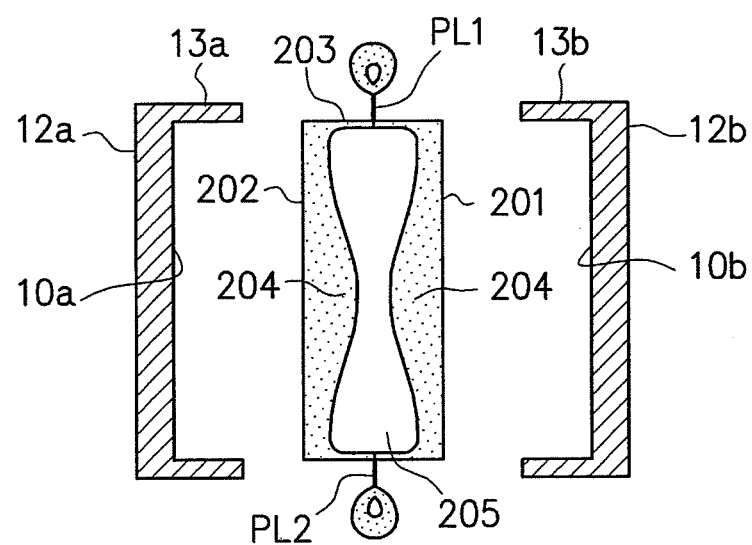

Next, referring to FIGS. 5 to 7, description will be given of an example of the molding method of molding the foam duct 200 of the present embodiment. FIG. 5 shows a state in which a cylindrical foam parison 14 is extruded from an annular die 11. FIGS. 6 and 7 show states of the foam parison 14 viewed from the annular die 11 of FIG. 5.

First, as FIG. 5 shows, various materials, for example, a resin prepared by adding a foaming agent to a polypropylene-based resin having an equilibrium compliance of 2.0 to 6.0 ($10^{-3} \times Pa^{-1}$) are melted and kneaded into foam resin. The foam resin is extruded from the annular die 11 of an extruding machine to form a cylindrical foam parison 14. The foam parison 14 is placed between split metallic mold blocks 12a and 12b. As a result, it is possible to arrange the foam parison 14 between the split metallic mold blocks 12a and 12b as shown in FIGS. 5 and 6(a).

Next, the mold blocks 12a and 12b are moved to the side of the foam parison 14 as shown in FIG. 6(b) such that cavities 10a and 10b respectively of the mold blocks 12a and 12b make contact with the foam parison 14. Portions of the foam parison 14 at positions 15a and 15b first brought into contact respectively with the cavities 10a and 10b of the mold blocks 12a and 12b are cooled and hence become harder than the other portions of the foam parison 14. These portions 15a and 15b are used to form projections 204.

Thereafter, as shown in FIG. 6(c), the mold blocks 12a and 12b are driven to the clamping state and the foam parison 14 is clamped between the mold blocks 12a and 12b. Both ends of the foam parison 14 are nipped by pinch-off portions 13a and 13b, to thereby accommodate the foam parison 14 in a space between the cavities 10 and 10b of the mold blocks 12a and 12b.

Next, in the clamping state of the mold blocks 12a and 12b, a blow-in needle and a blow-out needle are inserted in the foam parison 14. Compressed gas such as air is blown from the blow-in needle into the foam parison 14. The air passes through the inside of the foam parison 14 and is blown out via the blow-out needle, to thereby conduct the blow molding at a predetermined blow pressure. As a result, as shown in FIG. 7(a), the foam parison 14 is pushed against wall surfaces of the cavities 10a and 10b to be extended along contours of the cavities 10a and 10b.

In the foam parison 14 of the present embodiment, as FIG. 6(b) shows, the portions of the foam parison 14 at positions 15a and 15b first brought into contact respectively with the cavities 10a and 10b of the mold blocks 12a and 12b are cooled and hence become harder than the other portions of the foam parison 14, and have already made contact with the cavities 10a and 10b. Hence, as FIG. 7(a) shows, the portions at the positions 15a and 15b are less extended, and the portions at the other positions are extended along the contours of the cavities 10a and 10b. Particularly, the portions of the foam parison 14 not being brought into contact with the cavities 10a and 10b in the state shown in FIG. 6(c) remain soft, and have a long distance to make contact with the cavities 10a and 10b. Hence, these portions are most extended at a predetermined blow pressure. As a result, as FIG. 7(a) shows, the projection 204 is formed at the positions 15a and 15b where the portions of the foam parison 14 are first brought into contact with the cavities 10a and 10b of the mold blocks 12a and 12b in the state shown in FIG. 6(b). The portions not being brought into contact with the cavities 10a and 10b in the state shown in FIG. 6(b) are extended, to form portions which are thinner than the portions in which the projection 204 is formed. As a result, the thickness of the wall portion constituting the connecting portion 206 is greater in the portion in which the projection 204 is formed than in the portion in which the projection 204 is not formed.

When the blow molding is carried out at a predetermined blow pressure, it is possible to dispose a heat regulating unit to heat the compressed gas, which is supplied from the blow-in needle into the foam parison 14, to a predetermined temperature. Since the compressed gas supplied into the foam parison 14 is at a predetermined temperature, the foaming agent contained in the foam parison 14 easily foams. The predetermined temperature is favorably set to a temperature suitable to make the foaming agent easily foam.

It is also possible to conduct the molding without disposing the heat regulating unit. That is, the compressed gas supplied into the foam parison 14 is at a room temperature. Since it is not required to dispose the heat regulating unit to adjust the temperature of the compressed gas, the foam duct 200 can be molded at a low cost. Since the foam duct 200 is cooled after the blow molding and the blow molding is conducted at a room temperature, the period of time required to cool the foam duct 200 after the blow molding is reduced.

In the present embodiment, while compressed gas is being supplied from the blow-in needle into the foam parison 14, air is exhausted from the cavities 10a and 10b of the mold blocks 12a and 12b to remove the gap between the foam parison 14 and the cavities 10a and 10b, to thereby establish a negative-pressure state. This results in pressure difference between the inside and the outside of the foam parison 14 housed between the cavities 10a and 10b (the pressure in the foam parison 14 is higher than that outside the foam parison 14). Hence, the foam parison 14 is pushed against the wall surfaces of the cavities 10a and 10b to be extended according to the contours of the cavities 10a and 10b, to thereby mold a foam duct 200 including projections 204 in the duct inner surface.

In the molding process, it is not required to simultaneously conduct the process to blow compressed gas into the foam parison 1 and the process to produce a negative pressure outside the foam parison 1. These processes may be performed with an interval of time therebetween. Or, it is possible to conduct only one of these processes to carry out the molding in which the foam parison 14 is pushed against the wall surfaces of the cavities 10a and 10b to be extended according to the contours of the cavities 10a and 10b, to thereby mold a foam duct 200 including projections 204 in the duct inner surface.

Next, compressed gas such as air is supplied from the blow-in needle into the foam parison 14. The air passes through the foam parison 14 to be exhausted from the blow-out needle, to cool the foam duct 200 at a predetermined blow pressure.

When cooling the foam duct 200, the compressed gas supplied from the blow-in needle into the foam parison 14 is set to a temperature ranging from 10° C. to 30° C., preferably to a room temperature, e.g., 23° C. By setting the compressed gas to a room temperature, it is not required to dispose the heat regulating unit to adjust the temperature of the compressed gas; hence, the foam duct 200 can be molded at a low cost. Further, when the heat regulating unit is disposed to set the compressed gas to a temperature lower than the room temperature, the period of time required to cool the foam duct 200 is reduced. The cooling period of time favorably ranges from 30 seconds to 80 seconds although depending on the temperature of the compressed gas.

As a result, there is molded a foam duct 200 including projections 204 in the duct inner surface. After the foam duct 200 is molded, the mold blocks 12a and 12b are opened to take out the foam duct 200 therefrom, and then undesired portions such as burrs are removed as shown in FIG. 7(b). Resultantly, the foam duct 200 shown in FIG. 1 is obtained.
<Operation and Effect of Foam Duct 200 of Present Embodiment>

As above, in the foam duct 200 of the present embodiment, the cylindrical foam parison 14 is arranged between the mold blocks 12a and 12b as shown in FIG. 6(a) and the cavities 10a and 10b of the mold blocks 12a and 12b are brought into contact with the foam parison 14, to harden the portions 15a and 15b of the foam parison 14 first brought into contact with the cavities 10a and 10b as shown in FIG. 6(b). Next, as FIG. 6(c) shows, the mold blocks 12a and 12b are driven to the clamping state. In the clamping state of the mold blocks 12a and 12b, the blow-in and blow-out needles are inserted into the foam parison 14 to carry out the blow molding at a predetermined blow pressure, to extend the foam parison 14 according to the contours of the cavities 10a and 10b as shown in FIG. 7(a). As a result, the projection 204 is formed in the portions 15a and 15b first brought into contact with the cavities 10a and 10b in the state shown in FIG. 6(b). The portions not brought into contact with the cavities 10a and 10b in the state of FIG. 6(b) are extended to form thinner portions. Resultantly, there is molded the foam duct 200 including projections 204 in the duct inner surface as shown in FIG. 1.

Since the foam duct 200 of the present embodiment includes the projections 204 in the duct inner surface as shown in FIG. 2, it is possible to improve rigidity of the foam duct 200. Also, as FIGS. 3 and 4 show, when another member 300 is inserted in an inner surface side of the connecting portion 206 to engage the inner surface side of the connecting portion 206 with an outer surface side of the member 300 for the connection therebetween, the outer surface side of the member 300 makes contact with the projections 204, to thereby prevent the event in which the foam duct 200 is easily removed from the member 300. The projections 204 include foam resin. Hence, when the outer surface side of the member 300 makes contact with the projections 204 in the state shown in FIG. 2, the projections 204 deform according to the outer surface contour of the member 300, to hold the member 300 as shown in FIG. 4.

In the molding method described above, it is also possible to conduct low-pressure molding in which a suction process is carried out for the cavities 10a and 10b of the mold blocks 12a and 12b in the clamping state (sealed state) of the mold blocks 12a and 12b, to thereby extend the foam parison 14 according to the contours of the cavities 10a and 10b. In this situation, it is favorable to employ a configuration in which the suction is performed in a concentrated fashion for the portions not in contact with the cavities 10a and 10b in the state shown in FIG. 6(b).

In the foam duct 200 of the present embodiment, a gap exists between the inner surface of the connecting portion 206 and the outer surface of the member 300 as shown in FIGS. 3 and 4. However, to remove the gap, it is also possible that for example, as shown in FIG. 8(a), a packing member 400 such as foam urethane is pasted around the outer circumferential surface of the member 300, and the member 300 around which the packing member 400 is pasted is inserted in the inner surface side of the cylindrical portion 206 for the connection therebetween as shown in FIG. 8(b). Hence, it possible to prevent occurrence of the gap between the outer surface of the member 300 and the inner surface of the connecting portion 206. FIG. 8(c) shows an example of an X-X' cross-sectional configuration perpendicular to the hollow extending direction of the connecting portion 206 shown in FIG. 8(b). In this regard, it is not necessarily required to paste the packing member 400 onto the member 300 as shown in FIG. 8. It is also possible that the outer surface contour of the member 300 itself is designed to follow the inner surface contour of the connecting portion 206, to thereby prevent occurrence of the gap between the outer surface of the member 300 and the inner surface of the connecting portion 206.

Second Embodiment

Next, description will be given of a second embodiment.

In the description of the configuration example of the foam duct 200 according to the first embodiment, the connecting portion 206 includes no branch as shown in FIG. 1.

Figure 9:
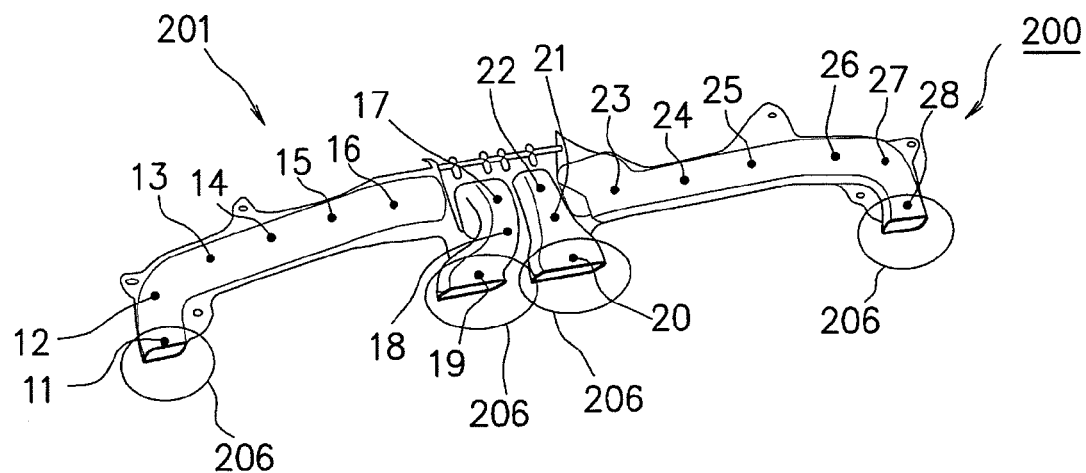
FIG. 9 is a diagram showing a configuration example of a foam duct 200 in a second embodiment.
Figure 9:
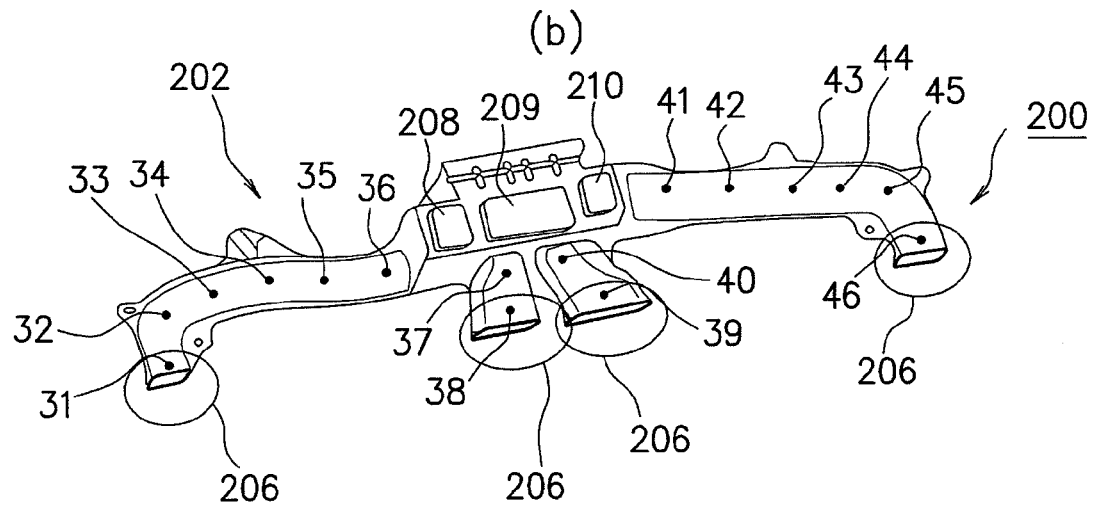

In the configuration example of the foam duct 200 in the second embodiment, the connecting portion 206 includes two or more branches as shown in FIG. 9. Also in the situation of the configuration example shown in FIG. 9, projections 204 are formed in the connecting portion 206. As a result, it is possible to prevent the event in which the foam duct 200 is easily removed from another member 300. Next, referring to FIGS. 9 to 13, description will be given of the foam duct 200 of the present embodiment. In the description below, an "inpane" duct will be employed as an example of the foam duct 200.
<Configuration Example of Foam Duct 200>

Figure 10:
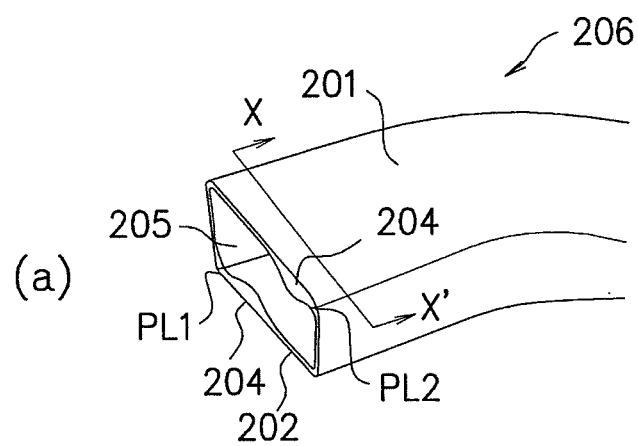
FIG. 10 is a diagram showing a configuration example of a connecting portion 206 of the foam duct 200 shown in FIG. 9.
Figure 10:
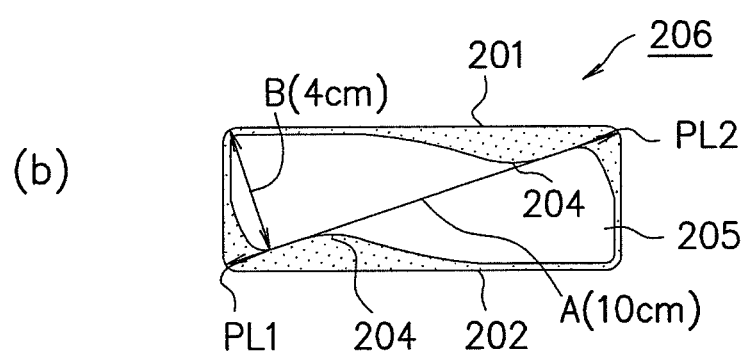
Figure 11:
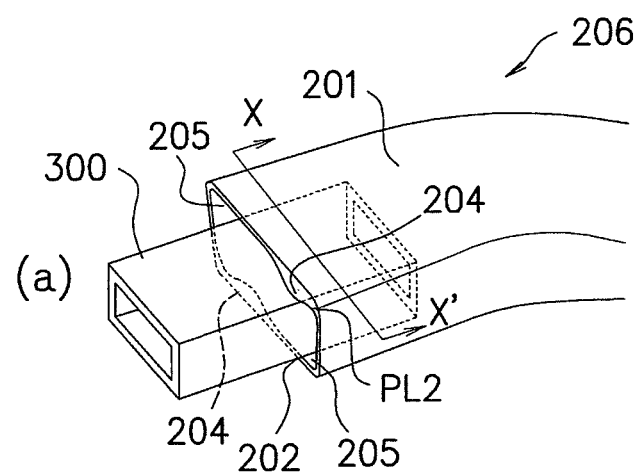
FIG. 11 is a diagram showing a state in which another member 300 is connected to the connecting portion 206 shown in FIG. 10.
Figure 11:
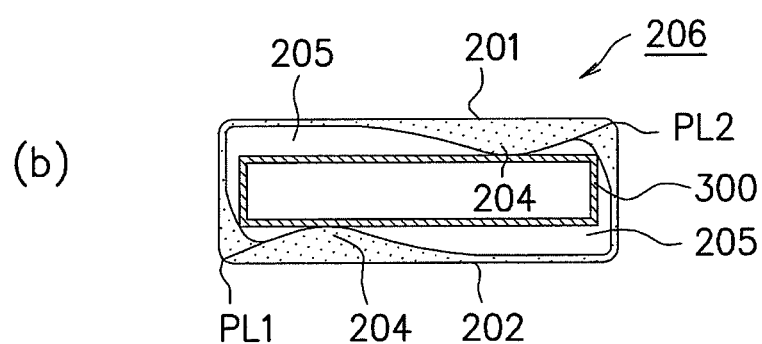

Referring to FIGS. 9 to 11, description will be given of a configuration example of the foam duct 200 of the present embodiment. FIG. 9 shows a configuration example of the foam duct 200. FIG. 9(a) shows the side of a first wall portion 201 of the foam duct 200. FIG. 9(b) shows the side of a second wall portion 202 of the foam duct 200. FIG. 10 shows a configuration example of a connecting portion 206 of the foam duct 200 shown in FIG. 9(a). FIG. 10(a) is an external perspective view of the connecting portion 206. FIG. 10(b) shows an example of an X-X' cross-sectional configuration perpendicular to the hollow extending direction of the connecting portion 206. FIG. 11 shows a configuration example in a state in which another member 300 is connected to the connecting portion 206.

The foam duct 200 of the present embodiment includes a first wall portion 201 and a second wall portion 202 which are welded onto each other via parting lines PL1 and PL2.

The foam duct 200 includes a hollow portion 205 in the duct such that fluid such as air flows through the hollow portion 205. The foam duct 200 also includes a connecting portion 206 to connect to another member 300. The connecting portion 206 includes two or more branches. The opening of the connecting portion 206 in this embodiment has a rectangular contour to configure a female-type connecting portion 206 as shown in FIG. 11 such that an inner surface side of the connecting portion 206 engages with an outer surface side of the member 300 for the connection therebetween. The foam duct 200 includes a projection 204 in an inner surface side of the connecting portion 206 as shown in FIG. 10. Thickness of the wall portion configuring the connecting portion 206 is larger in the portion in which the projection 204 is formed than in the portion in which the projection 204 is not formed.

The first and second wall portions 201 and 202 of the foam duct 200 have a mean thickness ranging from 2.0 mm to 3.0 mm. In the cross-sectional contour of the connecting portion 206 shown in FIG. 10(b), the difference in thickness between the portion in which the projection 204 is not formed and the portion in which the projection 204 is formed ranges from 0.5 mm to 1.0 mm.

The mean thickness is mean thickness calculated by use of thickness values measured at an equal interval of about 100 mm in the hollow extending direction of the foam duct 200. The hollow extending direction is a direction in which the hollow portion 205 extends in the foam duct 200 and is the direction in which fluid flows. The mean thickness on the side of the first wall portion 201 of the foam duct 200 is mean thickness calculated by use of thickness values measured at 18 positions, i.e., positions 11 to 19 and 20 to 28 on the side of the first wall portion 201 of the foam duct 200 shown in FIG. 9(a). The mean thickness on the side of the second wall portion 202 is mean thickness calculated by use of thickness values measured at 16 positions, i.e., positions 31 to 38 and 39 to 46 on the side of the second wall portion 202 of the foam duct 200 shown in FIG. 9(b). The mean thickness of the overall foam duct 200 is mean thickness calculated by use of the mean thickness on the side of the first wall portion 201 and the mean thickness on the side of the second wall portion 202.

In the cross-sectional contour of the connecting portion 206, the thickness takes the maximum value in the portion in which the projection 204 is formed and the minimum value in the portion most apart from the line connecting the parting lines PL1 and PL2 to each other. As FIG. 10(b) shows, the blow ratio of the connecting portion 206 is a ratio (B/A), taken in the cross-section perpendicular to the hollow extending direction, between length A of the straight line connecting parting lines PL1 and PL2 to each other and distance B from straight line A to an outer surface of the wall portion most apart therefrom. The blow ratio is 0.4 in FIG. 10(b).

The foam duct 200 of the present embodiment includes the projection 204 on an inner surface side of the connecting portion 206. Hence, as shown in FIG. 11, when another member 300 is inserted in the inner surface side of the connecting portion 206 to engage the inner surface side of the connecting portion 206 with an outer surface side of the member 300 for the connection therebetween, the projection 204 makes contact with the outer surface side of the member 300. Further, since the foam duct 200 includes projections 204 in the vicinity of the parting lines PL1 and PL2, it is possible to more stably hold the member 300 inserted in the connecting portion 206 when compared with the first embodiment. Also, since the projection 204 includes foam resin, when the projection 204 makes contact with the outer surface side of the member 300 in the state shown in FIG. 10, the projection 204 deforms along the outer surface contour of the member 300 to stably hold the member 300 as shown in FIG. 11. It is hence possible to prevent the event in which the foam duct 200 is easily removed from the member 300. Incidentally, like the foam duct 200 of the first embodiment, the foam duct 200 of the present embodiment includes a projection 204 not only in the connecting portion 206 of the opening edge portion, but also in the duct inner surface other than the opening edge portion, to thereby improve rigidity of the foam duct 200. In this situation, the projection 204 is favorably disposed in a continuous fashion along the channel direction (hollow extending direction) of the fluid flowing through the inside of the foam duct 200. This further prevents deflection of the foam duct 200 and occurrence of vibration in the foam duct 200.

<Foam Duct 200 Molding Method Example>

Figure 12:
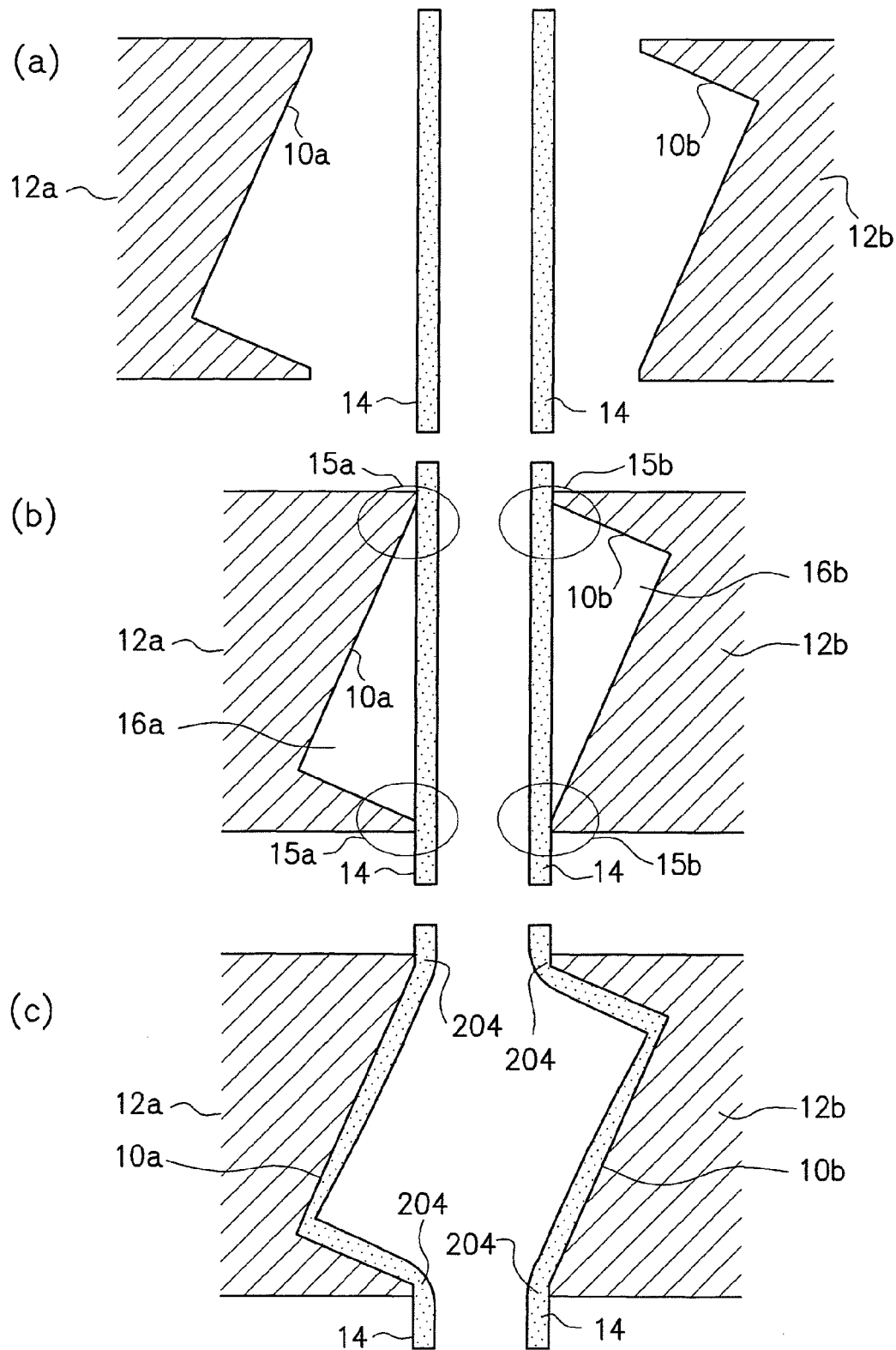
FIG. 12 is a first diagram showing an example of the molding method of the foam duct 200.
Figure 13:
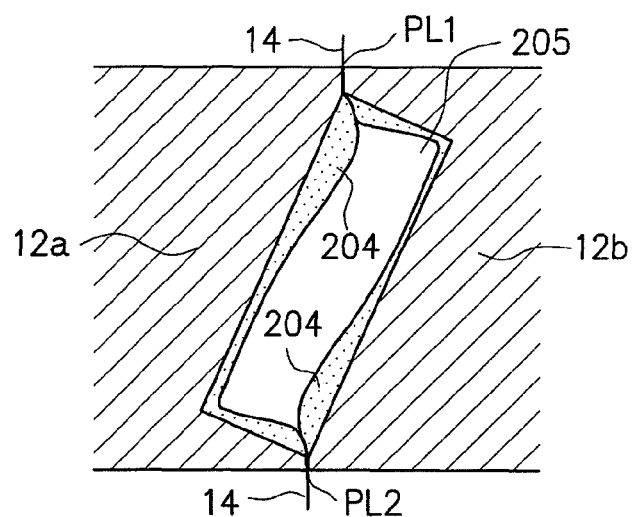
FIG. 13 is a second diagram showing an example of the molding method of the foam duct 200.
Figure 13:
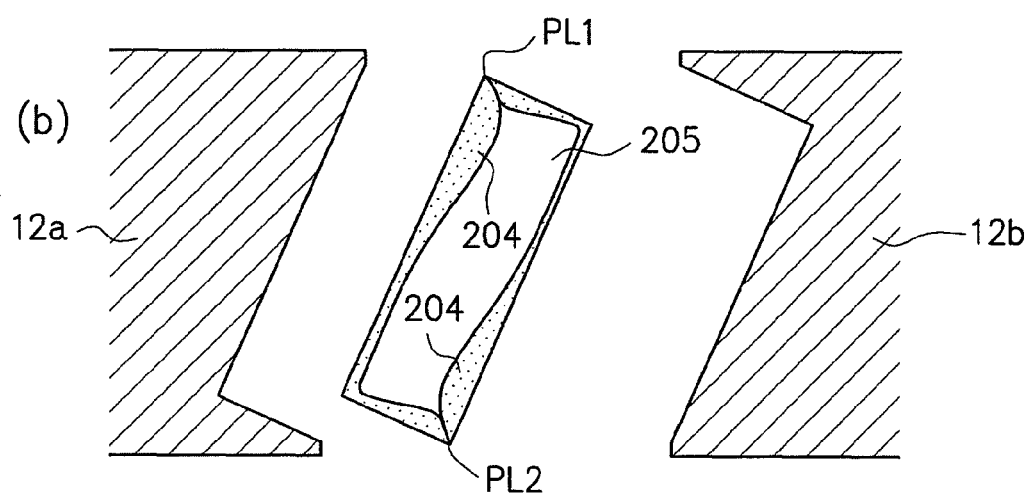

Next, referring to FIGS. 5, 12, and 13, description will be given of an example of the molding method of molding the foam duct 200 of the present embodiment.

As FIG. 5 shows, various materials, for example, a resin prepared by adding a foaming agent to a polypropylene-based resin having an equilibrium compliance of 2.0 to 6.0 ($10^{-3}\times$ $Pa^{-1}$) are melted and kneaded into foam resin. The foam resin is extruded from the annular die 11 of an extruding machine to form a cylindrical foam parison 14. The foam parison is arranged between split metallic mold blocks 12a and 12b. As a result, it is possible to place the foam parison 14 between the split metallic mold blocks 12a and 12b as shown in FIGS. 5 and 12(a).

Next, the mold blocks 12a and 12b are moved to the side of the foam parison 14 as shown in FIG. 12(b) such that cavities 10a and 10b respectively of the mold blocks 12a and 12b make contact with the foam parison 14, to form sealed spaces 16a and 16b by the foam parison 14 and the cavities 10a and 10b. Portions of the foam parison 14 at positions 15a and 15b first brought into contact respectively with the cavities 10a and 10b of the mold blocks 12a and 12b are cooled and hence become harder than the other portions of the foam parison 14. The projections 204 are formed by use of the portions 15a and 15b.

Next, the suction process is performed via the mold blocks 12a and 12b for the sealed spaces 16a and 16b such that the foam parison 14 is pushed against the cavities 10a and 10b, to shape the foam parison 14 in the contour along the cavities 10a and 10b as shown in FIG. 12(c). In a space formed by the mold blocks 12a and 12b of the present embodiment, a vacuum suction chamber, not shown, is disposed to be connected via suction holes to the cavities 10a and 10b. By conducting the suction process via the suction holes for the vacuum suction chamber, the foam parison 14 is adsorbed toward the cavities 10a and 10b, to thereby shape the foam parison 14 in the contour along outer surfaces of the cavities 10a and 10b.

In the foam parison 14 of the present embodiment, as FIG. 12(b) shows, the portions of the foam parison 14 at positions 15a and 15b first brought into contact with the cavities 10a and 10b of the mold blocks 12a and 12b are cooled and hence become harder than the other portions of the foam parison 14, and have already made contact with the cavities 10a and 10b. Hence, as FIG. 12(c) shows, the portions at the positions 15a and 15b are less extended, and the portions at the other positions are extended along the contours of the cavities 10a and 10b. Particularly, the portions of the foam parison 14 not being brought into contact with the cavities 10a and 10b in the state shown in FIG. 12(b) remain soft, and have a long distance to make contact with the cavities 10a and 10b. Hence, these portions are most extended at a predetermined blow pressure. As a result, as FIG. 12(c) shows, projections 204 are formed at the positions 15a and 15b where the portions of the foam parison 14 are first brought into contact with the cavities 10a and 10b of the mold blocks 12a and 12b in the state shown in FIG. 12(b). The portions not being brought into contact with the cavities 10a and 10b in the state shown in FIG. 12(b) are extended, to form portions which are thinner than the portions in which the projections 204 are formed.

Next, as FIG. 13(a) shows, the mold blocks 12a and 12b are driven to the clamping state and the foam parison 14 is clamped between the mold blocks 12a and 12b. Both ends of the foam parison 14 are nipped by the mold blocks 12a and 12b, to accommodate the foam parison 14 in a space between the cavities 10 and 10b of the mold blocks 12a and 12b. Further, peripheral portions of the form parison 14 are welded onto each other, to thereby form the parting lines PL1 and PL2.

After the foam duct 200 is molded, the mold blocks 12a and 12b are opened to take out the foam duct 200 therefrom, and then undesired portions such as burrs are removed as shown in FIG. 13(b). As a result, the foam duct 200 shown in FIGS. 9 and 10 is obtained.

<Operation and Effect of Foam Duct 200 of Present Embodiment>

As described above, in the foam duct 200 of the present embodiment, the cylindrical foam parison 14 is arranged between the mold blocks 12a and 12b as shown in FIG. 12(a), and the cavities 10a and 10b of the mold blocks 12a and 12b are brought into contact with the foam parison 14, to harden the portions 15a and 15b of the foam parison 14 first brought into contact with the cavities 10a and 10b as shown in FIG. 12(b). As FIG. 12(c) shows, the foam parison 14 is shaped into the contours of the cavities 10a and 10b, to extend the foam parison 14 according to the contours of the cavities 10a and 10b. As a result, the projection 204 is formed in the portions 15a and 15b first brought into contact with the cavities 10a and 10b in the state shown in FIG. 12(b), and the portions not brought into contact with the cavities 10a and 10b in the state of FIG. 12(b) are extended to form thinner portions. Next, by setting the mold blocks 12a and 12b to the clamping state, peripheral portions of the form parison 14 are welded to each other, to thereby form the parting lines PL1 and PL2. Resultantly, there is molded the foam duct 200 including projections 204 in the duct inner surfaces as shown in FIGS. 9 and 10.

Since the foam duct 200 of the present embodiment includes the projections 204 in the duct inner surfaces as shown in FIG. 10, it is possible to improve rigidity of the foam duct 200. Further, as FIG. 11 shows, when another member 300 is inserted in an inner surface side of the connecting portion 206 to engage the inner surface side of the connecting portion 206 with an outer surface side of the member 300 for the connection therebetween, the outer surface side of the member 300 makes contact with the projections 204, to thereby prevent the event in which the foam duct 200 is easily removed from the member 300. The projections 204 include foam resin. Hence, when the outer surface side of the member 300 makes contact with the projections 204 in the state shown in FIG. 10, the projections 204 deform according to the outer surface contours of the member 300, to hold the member 300 as shown in FIG. 11.

It is also possible in the present embodiment that a packing member 400 such as foam urethane is pasted around the outer circumferential surface of the member 300, and the member 300 around which the packing member 400 is pasted is inserted in the inner surface side of the cylindrical portion 206. Further, it is possible that the outer surface contour of the member 300 itself is designed to follow the inner surface contour of the connecting portion 206, to insert the member 300 into the inner surface of the connecting portion 206.

The embodiments described above are favorable embodiments of the present invention. The present invention is not limited to these embodiments, but various changes in form and details may be made therein without departing from the spirit and scope of the present invention as defined claims.

For example, in conjunction with the embodiments, description has been given of an example in which the foam duct 200 includes a projection 204 in the duct inner surface. However, the foam duct 200 shown in FIGS. 9 and 10 can be molded by using two foam resin sheets (each having the contour of a sheet) in place of the cylindrical foam parison 14. When the foam resin sheets are employed, it is possible to adjust sheet thickness of each foam resin sheet. Hence, the thickness may differ between the first and second wall portions 201 and 202, and the contour of the projection 204 may also differ between the first and second wall portions 201 and 202. As a result, it is possible to freely change the contour of the hollow portion 205 of the foam duct 200.

The contours of the cavities 10a and 10b of the mold blocks 12a and 12b employed to mold the foam duct 200 are not limited to those described above. The cavities 10a and 10b may be in any contour only if it is possible to form the projection 204 and the cavities 10a and 10b first make contact with part of the foam parison 14 or part of the foam resin sheet.

What is claimed is:

1. A foam duct comprising foam resin, comprising:
   a cylindrical portion having an external contour of a polygonal shape; and
   a projection in an inner surface side of the cylindrical portion, wherein
   thickness of wall portions of the cylindrical portion is larger in a portion in which the projection is formed than in a portion in which the projection is not formed.

2. A foam duct in accordance with claim 1, wherein the cylindrical portion includes opening edge portions.

3. A foam duct in accordance with claim 1, wherein:
   the foam duct has a contour deflected in three-dimensional directions; and
   the projection is formed in a continuous fashion in a channel direction of fluid flowing through the foam duct.

4. A foam duct in accordance with claim 1, wherein the projection is formed in an inner surface of a wall portion constituting the external contour of the cylindrical portion in a longitudinal direction.

5. A foam duct in accordance with claim 1, wherein difference in thickness between the portion in which the projection is not formed and the portion in which the projection is formed ranges from 0.5 mm to 1 mm.

6. A foam duct in accordance with claim 1, wherein the expansion ratio is 2.0 or more and the maximum blow ratio is 0.2 or more.

* * * * *